(12) United States Patent
Kelly

(10) Patent No.: US 8,630,669 B2
(45) Date of Patent: Jan. 14, 2014

(54) MESSAGING SYSTEM

(75) Inventor: Brian Kelly, Wicklow (IE)

(73) Assignee: OpenMIND Networks Limited, Dublin (IE)

( * ) Notice: Subject to any disclaimer, the term of this patent is extended or adjusted under 35 U.S.C. 154(b) by 0 days.

(21) Appl. No.: 13/148,475

(22) PCT Filed: Feb. 8, 2010

(86) PCT No.: PCT/EP2010/051523
§ 371 (c)(1),
(2), (4) Date: Oct. 6, 2011

(87) PCT Pub. No.: WO2010/089401
PCT Pub. Date: Aug. 12, 2010

(65) Prior Publication Data
US 2012/0021727 A1    Jan. 26, 2012

(30) Foreign Application Priority Data
Feb. 6, 2009   (GB) .................................. 0901917.5

(51) Int. Cl.
*H04W 4/00* (2009.01)
(52) U.S. Cl.
USPC ...................... 455/466; 455/414.1; 455/412.1
(58) Field of Classification Search
USPC ............... 455/412.1, 412.2, 414.1, 466, 566; 370/310, 328, 338
See application file for complete search history.

(56) References Cited

U.S. PATENT DOCUMENTS

| 5,719,918 | A * | 2/1998 | Serbetciouglu et al. ...... 380/271 |
| 6,480,712 | B1 * | 11/2002 | Vigil .......................... 455/412.2 |
| 8,185,142 | B2 * | 5/2012 | Hart et al. ..................... 455/466 |
| 2005/0124302 | A1 * | 6/2005 | Yoon et al. ................... 455/90.3 |
| 2008/0188251 | A1 * | 8/2008 | Weinrib ....................... 455/466 |
| 2009/0106455 | A1 | 4/2009 | Xu et al. |
| 2010/0255864 | A1 * | 10/2010 | Alfano et al. ................. 455/466 |
| 2011/0130158 | A1 * | 6/2011 | Celik et al. ................... 455/466 |

FOREIGN PATENT DOCUMENTS

| EP | 0896485 | 2/1999 |
| EP | 1422955 | 5/2004 |
| EP | 1605595 | 12/2005 |
| EP | 1628400 | 2/2006 |
| GB | 2334410 | 8/1999 |
| GB | 2404301 | 1/2005 |
| WO | WO2008080327 | 7/2008 |

OTHER PUBLICATIONS

"Digital Cellular Telecommunications System (Phase 2+); Universal Mobile Telecommunications System (UMTS); Technical Realization of Short Message Service (SMS) (3GPP TS 23.040 version 7.1.0 Release 7)," ETSI TS 123 040 V7.1.0 (Jun. 2008).

* cited by examiner

*Primary Examiner* — Jean Gelin
(74) *Attorney, Agent, or Firm* — Patrick J. S. Inouye; Krista A. Wittman; Makiko Coffland

(57) ABSTRACT

The present application relates to SMS text messaging and in particular to having a central repository for messages using SMS text messages to relay updates to the repository to and from user's phones.

30 Claims, 10 Drawing Sheets

MESSAGING SYSTEM

FIELD

The present application relates to the field of communications and in particularly to SMS text messaging.

BACKGROUND

Short Message Service (SMS) text messaging is one of the most pervasive forms of communication and familiar to most users of Global System for Mobile Communication (GSM) and other telephone networks. In the simplest form of operation an SMS message is sent from one mobile user to another mobile user through a SMS Centre (SMSC).

SMS messages may be transmitted within the same mobile telephone network or to anyone with roaming service capability.

SMS messages maybe either text as conventionally employed by users or binary coded messages. There are many variations on the way an SMS message is encoded, both for encoding "text" messages and for encoding "binary" messages. Generally speaking and more particularly, in the context of the present application text messages refers to messages which represent human readable SMS messages. Binary messages refers to messages which are not intended to be read by a user on their phone, i.e. non human-readable messages, such as OTA (Over The Air configuration) messages, Wireless Application Protocol (WAP) PUSH messages, ringtones, etc. The normative reference is the $3^{rd}$ Generation Partnership Project (3GPP) specification TS 23.040, currently at version 8.3.0 and available at www.3gpp.org.

The present application is directed at how SMS text messages are sent, delivered and stored.

Conventionally, SMS text messages are stored by SMSC's until the message has been delivered to a user. Once the message has been delivered or where delivery was not possible within a particular time period the message is deleted. The messages may be deleted once delivery is confirmed or periodically messages may be purged. As a result messages are only transiently stored at the SMSC.

Recently, services have been developed which extend the functionality of SMSC's or other devices within the mobile network so that SMS messages being received and sent by a user are intercepted. Once intercepted, the service can provide a value added service to the user. For example, a service may be provided which stores a copy of all messages received or sent by a user in a database. This database may then be accessed by a user, for example by means of a website, to review any message they have received or sent. Such a service is provided by O2 in the United Kingdom to its customers and marketed as BLUEBOOK™. Similarly, a SPAM or inappropriate text filter may be employed on intercepted SMS messages to prevent the delivery of such messages to a user. It will be appreciated that a variety of alternative services may also be provided using this technology.

Such services are facilitated by the use of home routing which would be familiar to those skilled in the art and provides that all messages received by a SMS user pass through their home SMSC or an associated router regardless of where the messages originate from. Where home routing is not employed, the benefits are less as the user's SMSC\router will not have full sight of all messages destined for the user.

Another development in the mobile phone environment is that availability of multi-SIM phone systems. In a multi-SIM configuration, a mobile user might have several phones with the same effective phone number. With telephone calls, the implementation of the system is relatively straightforward, in that if a user receives a call on a particular number, all of the phones associated with the particular number are rung and the phone which picks-up the call first is connected to the caller. At which time, the ringing on the other phones stops.

Messaging presents greater challenges. For example, consider the case of a user with two phones each associated with a common phone number, the first phone might be the personal mobile phone generally in the possession of the user, whereas the second phone might be a car phone. In a first mode of operation, the SMSC may send all messages to each phone separately. However, it will be clear in this situation; a user might receive and answer a number of messages on their phone in the office only later when entering their car to find the same messages waiting for them on their car phone. Obviously, this could be very confusing for a user. Accordingly, techniques are being developed which filter the destination of an SMS message using heuristic techniques to ascertain where the user is.

An alternative approach is that of Singtel who have a multi-sim product that requires the user to type\send a particular code to identify one mobile handset as the preferred handset for voice calls and SMS/Multi Media Messaging Service (MMS). Using these systems, the user only receives messages on one of their phones. However, it will be appreciated that this is a cumbersome system and means that a user viewing their messages on one phone will not have a message they received on the other phone. It also requires them to update their service continually.

The present application is directed at an alternative approach to handling SMS text messages.

SUMMARY

The present application is directed at a system for delivering SMS text messages to a user, the system comprises: a database for storing SMS text messages received at the system and associated with the user, an incoming interface for receiving a SMS text message destined for the user, wherein the interface is adapted to store the received SMS text message in the database, wherein the system is adapted to package the contents of the SMS text message within one or more binary coded SMS message and to forward this binary coded SMS message to the user. The advantage of this approach is that a flexibility is introduced as how to messages may be handled on the phone handsets with messages stored centrally, whilst maintaining the existing SMS infrastructures of mobile networks.

Suitably, the interface generates a message identifier for storage with the message within the database. The message identifier in combination with the identification of the sender may identify the message uniquely for the user within the database. As an alternative to a generated message identifier, the message timestamp may be used as it may be seen as unique (as set by the SMSC—see for example Section 6.2 of the 3GPP—SC Functional Requirements of 23.040 which mandates that the SMSC sets the timestamp of the message such that it uniquely identifies a message for a given destination). However, this approach is less preferred for a number of reasons. Firstly, it is conceivable that two different Service Centres could conceivably assign the same timestamp. In addition, as further messages as will be described below might be sent with the same unique identifier, it may be inappropriate to be sending messages with a particular date stamp weeks, months or even years after the particular date. Moreover depending on the configuration of the SMSC that lower layers of the messaging stack in the phone might just ignore a message with such an old timestamp.

The system may comprise an outgoing interface adapted to receive SMS text messages being sent by the user to destinations. This outgoing interface may be adapted to store a copy of each message within the database. Suitably, the outgoing interface generates a message identifier for storage with the message within the database. The message identifier in combination with the identification of the destination may identify the message uniquely for the user within the database. The system may be adapted to encode the message being sent by the user within at least one binary coded text message and to send this binary coded message to all of the user's devices for storage in a "sent" folder on each device. The system may be adapted to be responsive to an SMS message received from the user containing a direction for updating a state of a message stored within the database, whereupon the system may cause the state of the message within the database to be updated based on the received direction. In this case, the system may be adapted to send a SMS message to the user informing them of a change in state of the message on the database. The change in state may comprise one or more of the following: a) confirmation that message has been read, b) a request for deletion of the message, and c) a request for moving the message to a different location.

The application also extends to a mobile phone adapted to receive SMS text messages, wherein the phone is configured in response to the receipt of a binary coded SMS message to examine the content of the binary coded text message for an identifier identifying the contents as corresponding to a text message and upon identifying this message extracting the text message from the binary coded text message and presenting the text message to a user as an incoming SMS text message. Suitably, the messaging device comprises an application responsive to binary coded messages associated with a particular port and the application performs the task of extracting the text from the binary coded SMS message and presenting the text message to a user as an incoming SMS text message. The messaging device may further comprise a datastore and the device is adapted to store the extracted SMS text messages within the datastore. The messaging device may be adapted to extract a message identifier from the binary coded message and store this message identifier with the extracted SMS text message within the datastore.

The messaging device may be responsive to SMS text messages identifying a message within the datastore and identifying an action to update the state of the message within the datastore.

DETAILED DESCRIPTION

The present application solves the problems presented by the prior art by moving the primary location for storing messages from a user's mobile phone to a server associated with the network. To ensure that no significant changes to the network infrastructure are required, the present application employs SMS messages and or IP messages to distribute updates to one or more phones to synchronise the phones with the server and vice versa as required. Moreover, the system may be regarded as being relatively transparent to the user since they appear to conventionally receive and send text messages.

Figure 1:
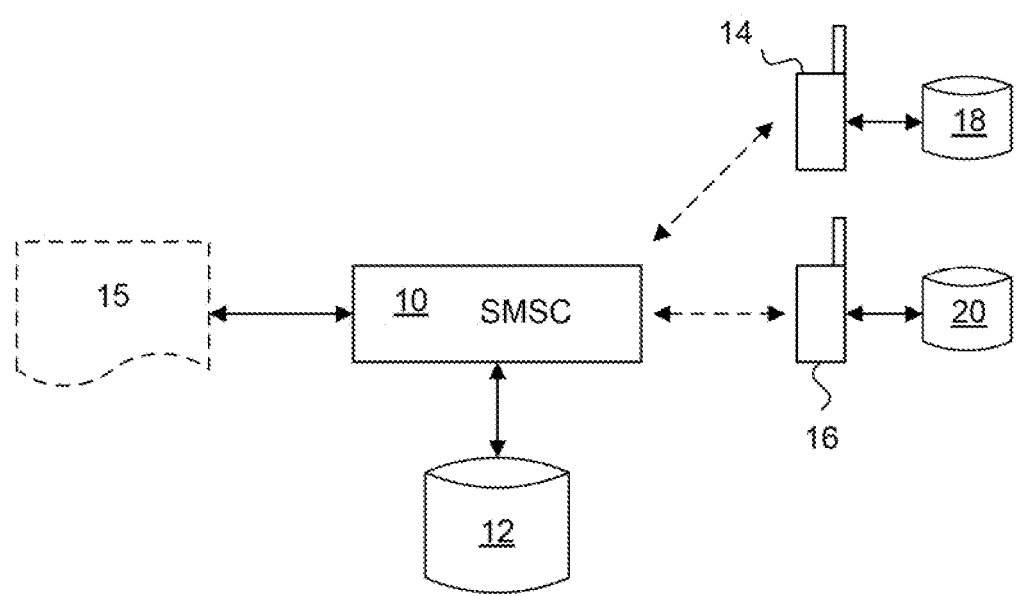
FIG. 1 is a diagram of an exemplary system according to the present application.

The system will now be described with reference to an exemplary system which is implemented within an SMSC 10 which is shown in FIG. 1 serving two messaging devices 14, 16 (e.g. mobile phones) sharing a common phone number. It will be appreciated that the system may be implemented in a device external to an SMSC, merely as node within the messaging infrastructure of the mobile operator's telecommunications network or as described in a further embodiment below external to the mobile operator's telecommunications network. The SMSC may receive SMS messages from these phones or others on the same network or from another SMSC 15 external to the network as would be familiar to those skilled in the art. For ease of explanation, the view of the mobile network has been simplified. The SMSC is configured to send and receive messages from phones connected to it or from another SMSC or other entity on the network 15 using conventional transport methods and protocols such as Signaling System No. 7 (SS7). As explained in the background, facilitating telephone calls in such a configuration is relatively straightforward but messaging presents particular difficulties. The present application is directed at ensuring that both devices 14 and 16 have a common view on the state of messages sent\received from their common number. In the present system, the SMSC or an associated device is configured using home routing to receive all messages destined for or received from a user. The SMSC or an associated device has a database 12 for storing messages received. The associated device may, for example, be a scalable Internet Message Access Protocol (IMAP) server. The database may be a SQL or similar database. Similarly, each of the phones has a local datastore 18 and 20 for storing messages. It will be appreciated that the local datastore will be very small as it for just one user, whereas the datastore 12 may store the messages of all users on the network and accordingly will be considerably larger and more complex.

Figure 2:
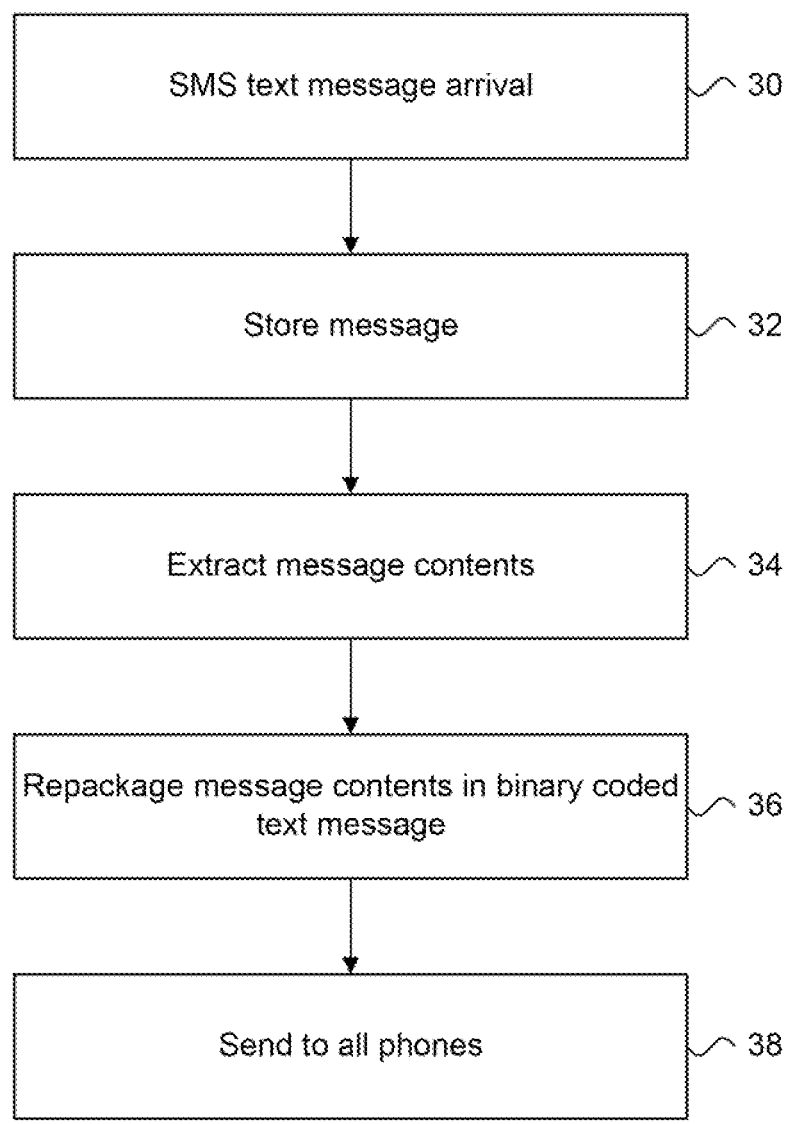
FIG. 2 is a flow chart of a first aspect of the application.

The manner of operation of the system will be better understood with reference to an exemplary method, as shown in FIG. 2, which commences with the arrival 30 of a text message for a user from a sender. The system stores the contents of the message within a database structure within the datastore 12. Each message is uniquely identified in the database. This unique identification may be by means of a unique identifier for each message, which may be incremented for each new message. In addition to the text contents of the message, other information contained in the message will also be stored, including the originator's address and the message timestamp.

Alternatively, each message may be uniquely identified by the message sender (OA), the message destination (Dest.) and a smaller unique identifier (ID). It will be appreciated that in this second instance, a smaller unique identifier may be employed since while a SMSC may process millions of messages, the number of messages a single user might send to another would be comparatively small.

In one arrangement, the unique ID may be generated from a combination of the originator's address, the destination and the message timestamp.

Figure 5A:
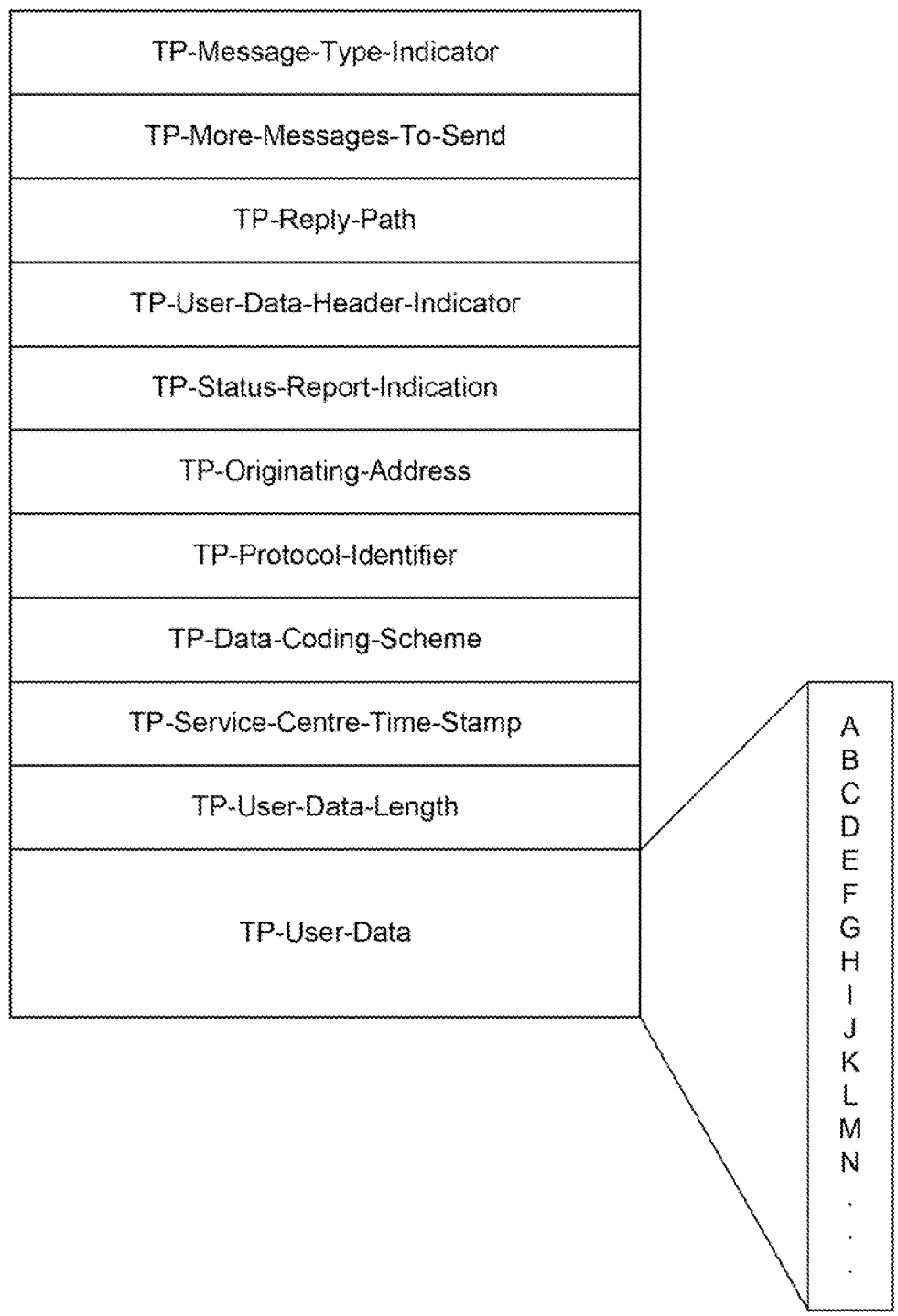
FIG. 5a illustrates the format of a SMS text message received by the system for a user.
Figure 5B:
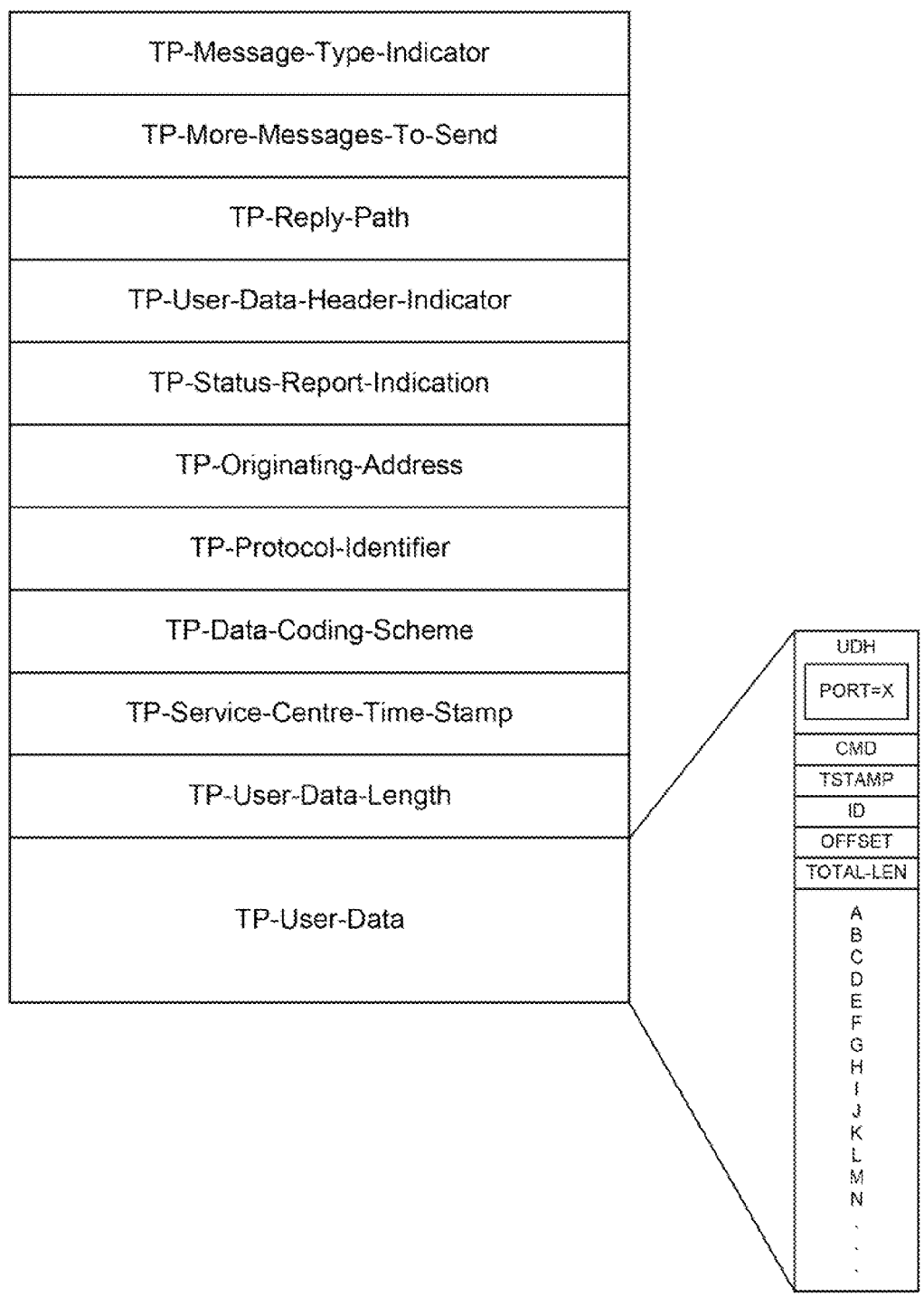
FIG. 5b illustrates a resulting exemplary format used for a binary coded text message sent from the system to the user incorporating the text of the SMS text message.

The content of an exemplary received text message is shown in FIG. 5a, from which a corresponding database entry might be generated. After the message has been stored, the system packages the contents of the received SMS text message into a binary coded text message as shown in FIG. 5b and transmits to the handsets 14 and 16 sharing a common number. It will be appreciated that a conventional prior art handset not configured for use with the present application would not regard the incoming binary coded SMS message as a text message and how such phones would react to the incoming message would depend upon the individual phone's configuration.

In contrast, handsets 14 and 16 are specifically configured to respond to incoming binary coded messages of this type. The specific configuration may be by addition of a software application to the phone or by specific accommodation of the functionality within the operating system of the phone. In the case of the first option, the additional software application is an alternate messaging application, which suitably appears to the user as if they were they were using the existing messaging application on the phone.

A user-data-header as would generally be familiar to those skilled in the art albeit not for the purpose described herein, is included within each binary coded message. The presence of this user-data-header is signalled by the setting of the user-data-header-indicator in the SMS-DELIVER message (see for example section 9.2.2.1 of the 23.040 3GPP standard). This user-data-header can contain 0 or more Information-Element Identifiers specified in section 9.2.3.24 of the 23.040 3GPP standard. It is possible to include an 0x04/0x05 IEI which defines an "application port" (PORT) that the message is targeted at. Using this mechanism, the messaging application, through configuration data, may be associated with one or more destination ports and on receiving a message targeted at that port, the handset invokes the application to process the message.

An alternative approach would be to employ a proprietary value for the Protocol-Identifier (TP-PID, defined in 9.2.3.9 of the 23.040 spec 3GPP standard) to signal to the handset that this message is actually one of these intercepted and re-encoded messages described herein and that it should be handled differently, i.e. that the messaging application should be invoked to process the message. It will be appreciated that other techniques may also be employed to cause the invocation of the alternative messaging application.

The payload of the message suitably includes a number of further values which may be interpreted and employed by the messaging application. For example, the binary coded text suitably includes a command value (CMD). This command value may be used to identify the purpose of the message being sent, i.e. whether the message is a new message, an indication that it has been opened\read or an indication to delete the message as will be explained in greater detail below. A time stamp is also enclosed (TSTAMP). Segmentation information (offset\total-len) may also be included to detail instances where a message is such a size that more than one message is required to transmit all of the text and the value indicates the total length (total-len) of the message and the appropriate place (offset) of the current text in the overall message. It will be appreciated that these values may only be required when the text, User Data Header (UDH) (port), command, time stamp and ID do not fit within a single message. The text of the original text message is also encoded with the other elements of the message payload. It will be appreciated that the message payload may not be required where the message text was previously forwarded with a different command value, e.g. if a message is initially sent as new message, then a subsequent message with a command to delete it need not include the text again since the message would be uniquely identified by the reference and the text is redundant.

Figure 3:
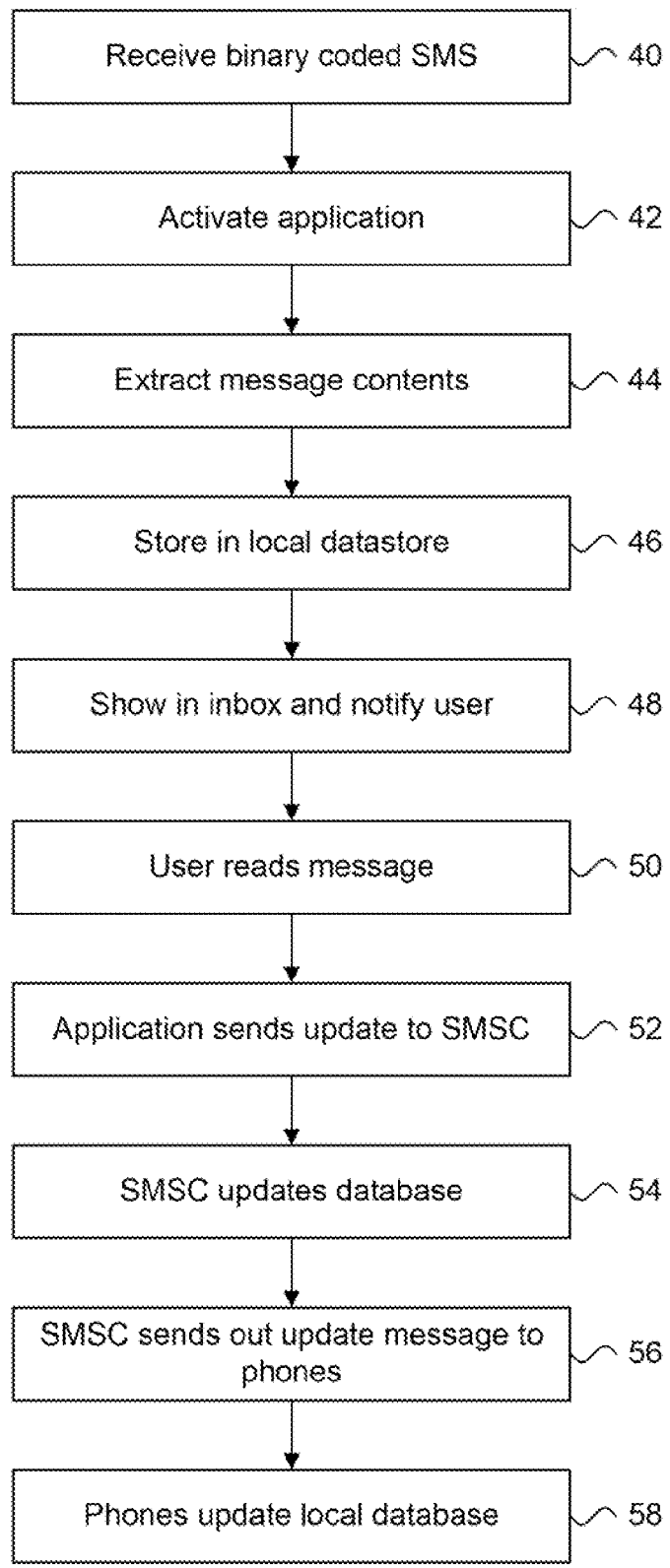
FIG. 3 is a flow chart of a second aspect of the application.

With reference to FIG. 3, upon receipt 40 of a binary coded SMS message, an application\function is activated 42 which examines the binary coded message and extracts 44 the corresponding text message and fields from the binary coded message. The text contained within the payload may be encoded in a suitable manner and may, for example, be compressed in accordance with a technique for which a corresponding decompression technique is available to the handset application. The extracted information including the text is stored in the local datastore of the phone 46. The Application then presents 48 the user with a notification, e.g. a visual and\or audio alert, to show 48 the arrival of a new message in their inbox as would be familiar to most phone users. It is intended that the message would appear to the user as if it was a conventionally received SMS text message. In the arrangement shown in FIG. 1, both phones 14 and 16 would receive the message and generate a message alert to the user. As described further below, the SMS message itself may simply be forwarded to the user's phone as a conventional SMS message with status updates on the message being provided by means of binary coded messages or other transport mechanism. It will be appreciated that in such a situation, the unique ID selected should be inherent from the message contents. In this respect, a message may be regarded as uniquely identifiable from a combination of the OA (originating address, i.e. message sender), the DA (destination address, i.e. message recipient) and the message timestamp. It will be appreciated that other elements of the message may be used in addition to or as replacements for one or more of these values. However, the use of a combination of sender (OA), recipient (Dest.), and timestamp provides an efficient ID which would typically produce a unique value.

A user may then open 50 the message on their handset using the application described above. Once the user has read the message, the application on the handset generates a status update message, suitably comprising a binary coded SMS message indicating the status of the message has been changed, i.e. that it has been read. This binary coded SMS message suitably includes an identification of the message and the status change. The status update message is sent 52 to a pre-established number associated with the SMSC. It should be noted that the handset does not necessarily make any changes to the status of the message within the handset, i.e. the handset may still show the message as having been unread.

Upon receipt of the status change binary coded SMS message, the SMSC updates the status of the message within its database 12, i.e. to show that the message has been read. The SMSC then generates a further message status update, for example within a binary coded SMS message, directing that the status of the message has been changed, i.e. that it has been read. As before, the binary coded SMS message suitably includes an identification of the message and the status change. The status update message is then sent 56 to the phone(s) of the user.

The phones upon receipt of this message update 58 the status of the message in their local datastore to show the message as having been read. It will be appreciated, that even though the action to read a message occurred on one of the handsets, it was the server which sent the instruction to update their local datastore. This ensures that the SMSC is the primary place where messages and their status is stored. For users, the application may be configured to temporarily show the message as having been read on the phone for a short period of time until the actual "mark as read" command arrives to confirm this state. In the event that the command does not arrive with a predefined period, it may mark the message as unread again.

Figure 4:
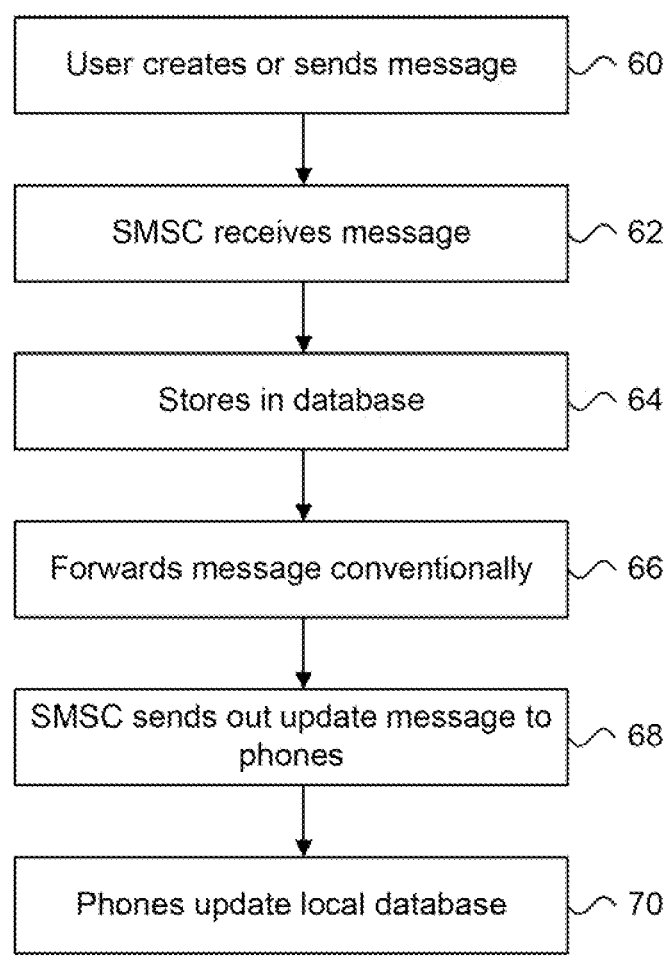
FIG. 4 is a flow chart of a third aspect of the application.

The same functionality may also be applied to sending messages, as will now be explained with reference to the process flow of FIG. 4. In a conventional prior art handset, it is known to store copies of messages sent. Clearly, in the situation where there are several handsets sharing a number, if one handset sends a message it can store a copy of the messages it is sending but the other handsets will effectively be blind to this message.

The present application also solves this problem. A user may compose and send 60 a text message by conventional means on their phone. The handset may then send the SMS text message conventionally to the SMSC. In contrast to the prior art handsets\applications, once the message has been sent, a copy of the message is not necessarily stored as a sent message within the phone (i.e. not appearing as a sent message in a sent messages folder).

Upon receipt 62 of the message at the SMSC, a unique identifier is generated and the message is stored 64 within the database 12. The message is then forwarded 66 to the destination using conventional techniques. The SMSC may then send 68 a status update message to the user's phone(s) indicating that the message has been sent. Specifically, the SMSC may create a binary coded SMS message including the contents of the sent SMS text message and a status to indicate it has been sent. This binary coded SMS message is then sent to the user's handsets 14 and 16, which in turn extract the contents and store 70 the extracted message locally in their respective datastores 18, 20 as a sent message. In this way, although a first handset 14 may have actually sent a particular message, both handsets might retain a copy of the message.

If a user performs a function to change the status of a message (e.g. deletion of a message or moving a message to another folder), the handset may send such a request to the SMSC in the form of a binary coded message identifying the message and the status change which in turn updates the status of the message on the database of the SMSC and then sends corresponding binary coded status change messages to the handsets to replicate the change on the datastores of the handsets. It should be appreciated, that the user's messages within the individual datastores on the handsets may be different to those on the database of the SMSC, for example by virtue of memory constraint. Thus for example in the case of a status request to delete a message, the SMSC may simply update the status of a message on the database to show it as having been deleted. The message may however still be present in the database. In contrast, on a handset when an indication is received from an SMSC that a message with a particular reference has been deleted, the handset may respond by deletion of the message with this reference from the local datastore.

A further advantage of the present system is that the contents of the SMSC database may be made available to users by means of alternative interfaces. Once such interface would include an IP connected phone, such as a softphone which is a software application typically operating on a desktop computer. Such softphones employ an IP connection to connect to a telephone network (either a private/corporate PBX or a large PSTN), typically using a SIP based protocol. It has all the capabilities of a normal phone, making calls, answering calls often including some kind of messaging client which behaves like SMS. An example of such a device is the Mobilkom Austria offering "A1 over IP". In these arrangements, a mobile phone may be replicated on a computer as a softphone, whereby an sms sent to/from a mobile phone might be replicated on the softphone by the SMSC sending the updates described above over the IP connection to the softphone.

Another possibility would be the provision of a web interface similar to the O2 Blue Book described above. However, in contrast to the Blue Book service, the web interface would be capable of presenting a representation of the messages of the user that corresponds directly to the content of the message boxes on the individual's handset rather than simply a copy of all messages sent and received by a user. Moreover, it will be appreciated that with the ability to send status update messages to the handset, that a message may be deleted\moved using the web interface and this change may be propagated to the user's phone(s). It will be appreciated that further functionality may be employed including the possibility of restoring deleted messages to a handset, whereby a user using a web interface could review messages marked as deleted and undelete them. In turn the SMSC would update the database showing the undeleted status and sent an update by means of binary coded text message to the user's handsets.

It will be appreciated, that the message functionality\settings on the phones may also be stored centrally on the SMSC and replicated on the handsets. For example, a known option is to save\not save copies of sent messages. If a user elected to change this option on their handset, an application might send a binary coded SMS message to the server indicating that a change in this option was required. This option might be updated in the database and binary coded SMS messages sent to the handsets to replicate the setting on the SMSC database. Similarly, if a user was to create folders for their messages, information on these folders could similarly be sent as updates.

Figure 6:
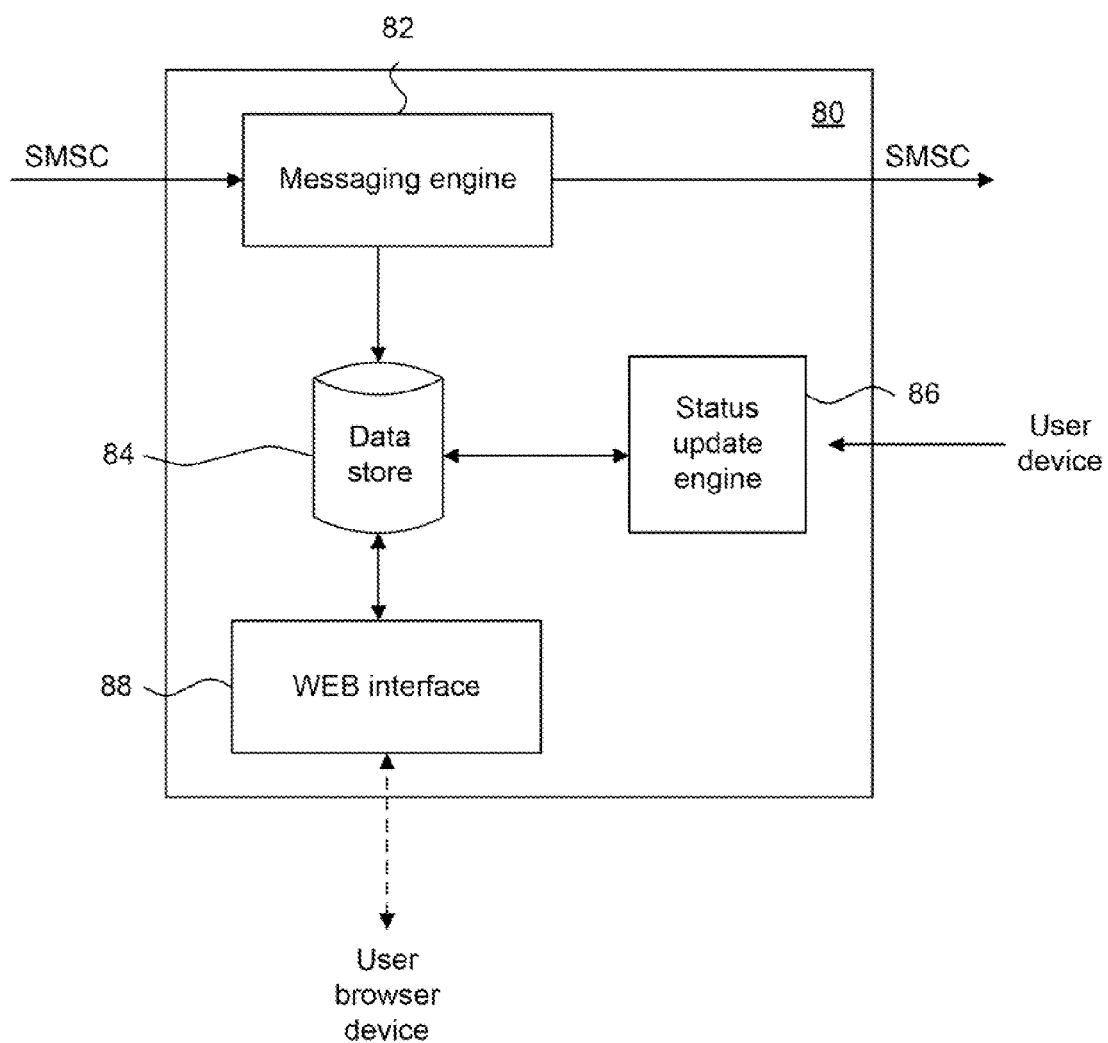
FIG. 6 illustrates a block diagram of an exemplary SMS message repository.

Further advantages will become apparent from the arrangement of FIG. 6, which may be viewed as a message repository 80 for SMS messages for a plurality of users. As shown in FIG. 6, this repository may be adapted to intercept SMS messages using for example the home routing techniques described above.

Upon interception of an SMS message by a messaging engine 82 of the message repository, the messaging engine may cause the SMS message to be stored in a datastore of the message repository similar to as described above with reference to FIG. 1. As described above, the datastore may be a suitable provided in a conventional database structure, e.g. a SQL database. The messaging engine also forwards the SMS message onto the user (or more specifically their SMSC). When the message is stored in the Message Server, the originator's SMSC may send a delivery confirmation to the originator if it was requested.

It will be appreciated that the SMS message may not be stored in its entirety. Instead, required elements may be extracted from the SMS message and stored. For example, the text along with information from the header of the message sufficient to uniquely identify each message. In this respect, the identities of the message sender, the message recipient and the time stamp of the message would be sufficient to identify messages uniquely. Of course, it is desirable to also stored the text content of the message.

To improve the speed of access to the datastore, a unique identifier may be generated for the message using for example a hash function or similar technique performed upon the information required to uniquely identify each message, which may for example be the sender, recipient and time stamp. It will be further appreciated that the hash function may not be used and the unique ID may simply comprise the combination of sender, recipient and time stamp.

The unique identifiers may be stored in the datastore and associated with their message using conventional database techniques. It will be appreciated that the unique identifier may be implicitly stored by storing the values that make it up, for example the sender, recipient and time stamp.

It will be appreciated that whilst the unique identifier may be used to improve the performance of the system accessing the datastore and\or for other reasons which will become apparent below with respect to users communicating with the repository, it may remain beneficial to also store some of the information from the message header, including for example the sender, the recipient and the timestamp of each message so that this information is available to users.

Each SMS message has a status associated with it. The status for each message is also stored in the datastore of the repository. In this respect, the repository may initially store a status of unread for a message, indicating that a recipient has not read the message. It will be appreciated that an unread message is not the same as a non-delivered message. Since a message may be successfully delivered to a recipient's mobile phone and remain in the inbox for some time before the recipient actually opens the message and reads it.

The repository may have a web interface 88 allowing a user to access their messages on the repository by means of a conventional web page accessible by means of an Internet browser on a computer. The web interface may be configured to present the user with a list of their SMS message folders and the messages contained in each folders using web programming techniques which would be familiar to those skilled in the art. Security and other techniques including customisation may be implemented within the web interface using techniques familiar to those skilled in the art including the use of passwords and cookies. Similarly, the web interface may use secure methods for communication including for example SSL and https to ensure that their data remains private.

Figure 7:
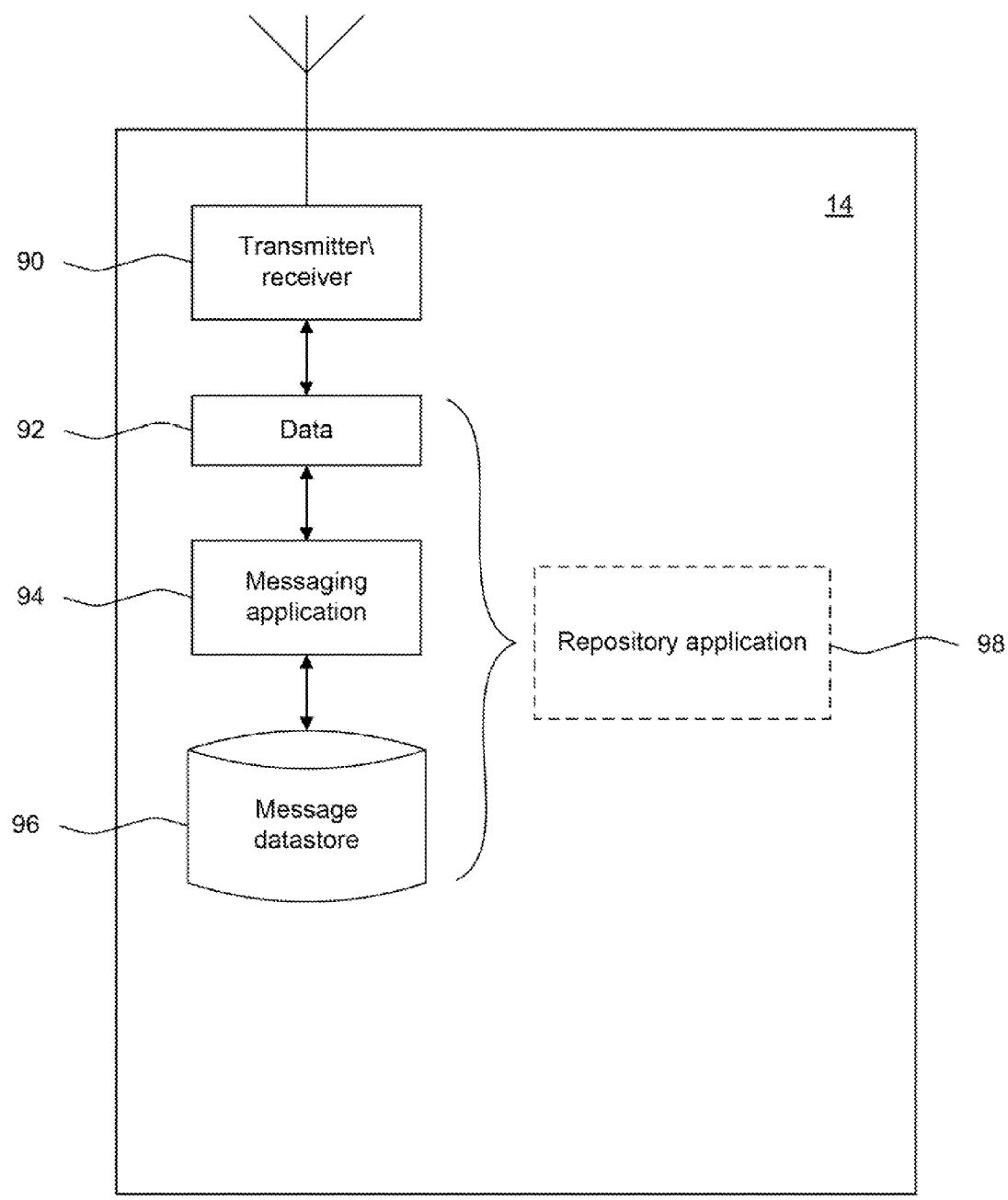
FIG. 7 illustrates a block diagram of a mobile SMS messaging device having a repository application contained thereon for co-operating with the message repository of FIG. 6.

As described above, the mobile phone of the user may be adapted to react to messages and user's actions upon these messages as will now be explained with reference to FIG. 7, in which a conventional arrangement for a mobile phone 14 is provided comprising a transmitter\receiver 90 for the transmission\reception of voice, and data. For simplicity, elements related to voice have been omitted. A data interface 92 receives data from the receiver circuitry and determines the appropriate application for the data. In this respect, the data may be a SMS message, MMS data or for example IP data. Again for simplicity only the SMS data path is shown. The data interface may also provide data from applications to the transmitter.

As in a conventional mobile phone arrangement, the data interface provides SMS data to an SMS messaging application 94. This messaging application in turn stores received messages in a local message datastore 96. As would be familiar to those skilled in the art, the messaging application may notify the user of a message arrival, display messages to users and allows users to delete messages or create messages.

In contrast to a conventional arrangement however, a repository application 98 is provided on the phone. This repository application may be preinstalled on the phone or installed subsequently by a user. This repository application is responsible for interacting with the message repository described above. The repository application may be separate to or included within the messaging and\or data interface application on the phone. As described above, the messaging\data application may be replaced by another messaging\data application which incorporates the functionality of the repository application.

For example, the repository application may be a standalone background application running on the phone which periodically reviews the contents of the message datastore for changes.

Figure 8:
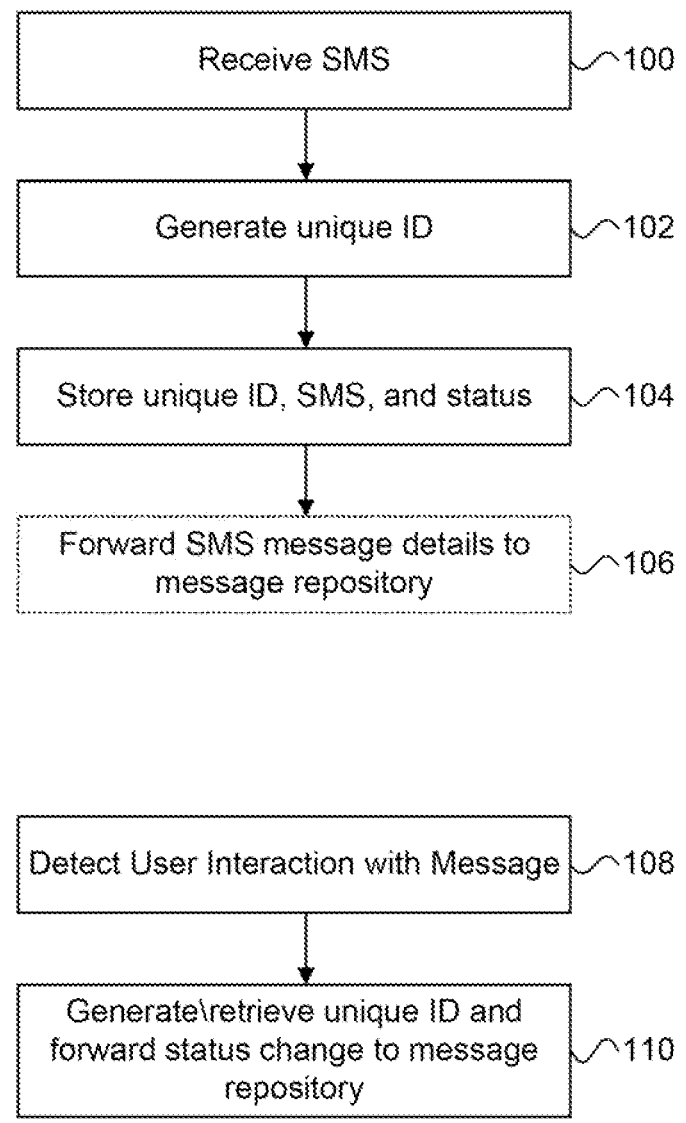
FIG. 8 is an exemplary method that may be performed by the repository application of FIG. 7.

An exemplary mode of operation of the repository application will now be described with reference to FIG. 8. It will be appreciated that where the repository application is integral with the messaging application, the detection of the arrival of a SMS message would be inherent upon the receipt 100 of an SMS message. The repository application can generate 114 a unique ID for the SMS message from the message itself. As described above, the repository application may extract the SMS message from a received binary coded message and store 104 the SMS message and a status for the SMS message in the message datastore. It will be appreciated that the status of the SMS message may be indicated by its location within the datastore. It will be appreciated that where the SMS message was packaged within a binary coded message that it must be extracted first. For example, a message may be identified as a sent message if contained within a sent messages folder. The SMS message can be optionally forwarded to the message repository as described below with reference to FIG. 9.

Upon detection 108 of a change, e.g. a change of the local status of the message from read to unread, the repository application may cause a status update message to be sent 110 to the repository through the data interface and hence the transmitter to the repository. The status update message may be sent, as described above, within a binary coded text message or other transport mechanism available between the phone and the repository. Alternatively, the repository application may be configured to send the status update message using an alternative transport mechanism, for example by means of an IP connection to the repository. Suitably, the status change message will identify the message, for example by means of a unique identifier which may be generated from the contents of the message in the same manner as performed at the repository. The status change message suitably also identifies the change that has taken place.

Similarly, the repository application may be responsive to status change messages received from the repository. These status change message may be received from the repository, as described above, as binary coded text messages. Alternatively, the status change messages may be received by an alternative transport mechanism such as an IP connection between the repository application on the phone and the repository. Similarly, Unstructured Supplementary Service Data (USSD) may be employed for sending the status change messages.

Upon receipt of a status change message from the repository, the repository application is configured to identify the message and update the status of the message in the message datastore on the phone. Updating the message status may include deletion of the message from the datastore.

Whilst many users may just have an inbox and sent box in their local message database on their phone, it will be appreciated that certain phones allow the user to create further folders and to move messages from one folder to another in their message database. Accordingly, the repository application may also be configured to retrieve folder information from the message datastore and to provide this information to the repository. The repository application may perform this for all folders during an initialisation process by the repository application and thereafter when a folder is changed, for example added, deleted or moved. The folder information may identify the structure along with the folder names. It will be appreciated that in this arrangement, the status change update messages sent by the repository application from a user's phones may include a "moved" status indicating that the message has been moved. Status update messages may also indicate the folder to which a message has been moved.

Similarly, the repository may also be configured to store folder information for each user as received from the repository application of each user. The folder information may identify the structure along with the folder names. Additionally, the status change update messages sent from user's mobile phones may include a "moved" status indicating that the message has been moved along with an indication of which folder a message has been moved to.

Whilst, the above description has been made with primary reference to using binary coded messages to distribute message status updates and messages, it will be appreciated that alternative transport mechanisms may also be employed including for example the use of and IP connection or as mentioned above USSD.

In a further arrangement, the teaching of the present application may be applied in circumstances where the repository does not necessarily have access to the SMSC infrastructure of the user's mobile network. It will be appreciated that in such a scenario, interception of messages is not practicable. Even where access is available, the technique which follows may offer advantages. For example, where a user has several mobile phones sharing a number (multi-SIM), if one of the phones is such that the software may not be modified, it will be appreciated that SMS messages encoded with a binary coded SMS would not be seen on the phone. Accordingly, it is an advantage if SMS messages are sent conventionally from the telephone network to the user. In such a configuration, status updates indicating the actions a user has performed on the messages on the phones may be uploaded by a repository application present on the phone. It will be appreciated, that where there is no repository application on a phone SMS messages may still be received and sent from the phone.

In particular, the repository application on the user's phone has a connection, e.g. by means of IP or SMS messaging, with the message repository. In such an arrangement, the mobile network may be configured to conventionally deliver messages to the user's mobile device. It will further be appreciated that in this arrangement, the repository need not be part of the user's mobile network merely accessible through the user's network. Where an IP connection is employed, the repository and its messaging engine need not even be in a mobile phone network per se merely connected through the Internet or similar network.

Figure 9:
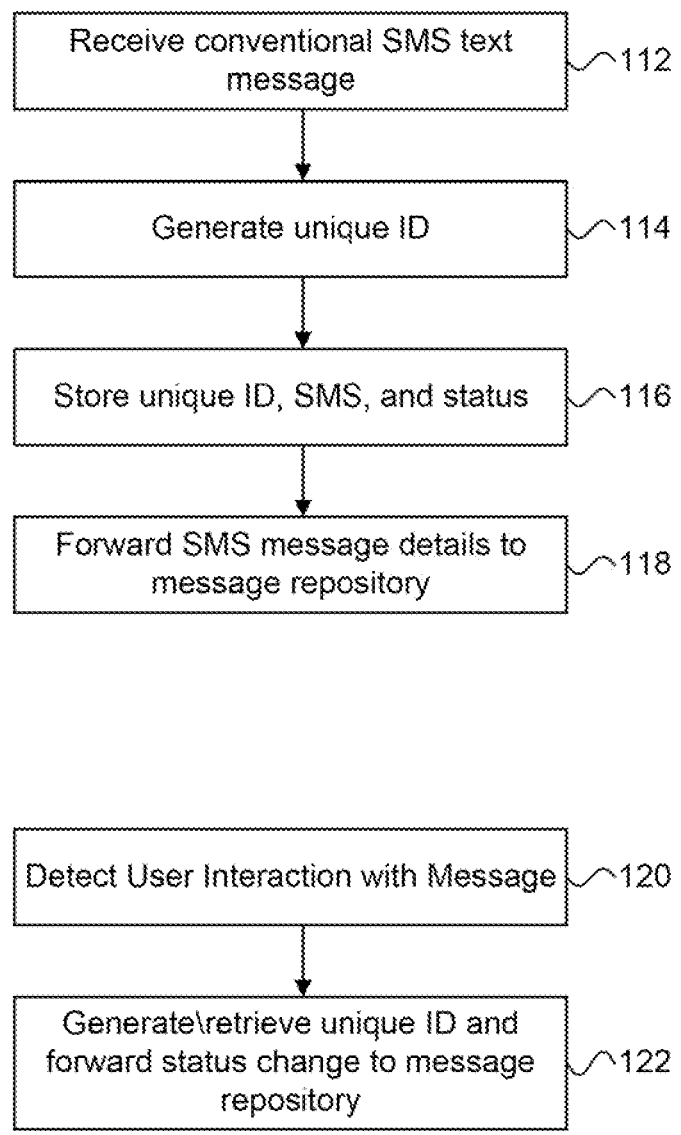
FIG. 9 is a further exemplary method that may be performed by the repository application of FIG. 7.

This further arrangement will now be explained with reference to the process flow chart of FIG. 9. Upon receipt 112 of an SMS message, the repository application may be configured to generate 114 a unique ID for the message from the message itself. As with a conventional messaging application, the repository application may store 116 a copy of the message in the local datastore. It may also store the unique message id and a message status. However, in contrast to the previous applications, the repository application on the user's phone may be suitably configured to forward 118 a copy of the message to the messaging engine of the repository. It will be appreciated that in this context of this mode of operation and the previously described implementation the functionality of the messaging engine and the status update engine may be performed together. The copy of the message may be a reduced form of the message containing only that information which is required, which may for example comprise the contents of the text message, the sender, the recipient and the time stamp. Upon receipt of the copy, the repository stores the copy in the repository datastore.

It will be appreciated that where a user has several phones, the network may be configured to deliver the messages to just one phone (as described in the background above). However, in the absence of such a configuration, several copies of the same message may be received by the message repository from the repository applications on the different phones of the users. In this arrangement, the repository may be configured to check for the prior existence of a message before storing a message. As before, the unique identifier may be stored with each message.

Once the repository has updated its datastore it may promulgate the message to the user's other phones by means of a status update message via an IP connection from the message repository to the individual phones.

In turn, when a repository application on a phone detects 120 a change in status on a phone, for example a user opening an unread message, the repository application may forward a status update message to the message repository 122 as described previously. In this way the message repository is kept updated with any changes made on a phone. As described above, the message repository may send out status updates to the phones reflecting any changes of message state occurring on the repository database, either directly for example by means of a user interacting by means of a web browser with the message repository or indirectly where a message status update has been sent from a user's phone.

It will be appreciated that the methods, applications and systems described herein allow a user to effectively remove the message functionality from their phone to the repository. The message functionality is no longer tied to an individual phone.

It will thus be appreciated that whilst the present application has been described with respect to the advantages obtained where there are multiple handsets for a single user, there are numerous advantages even where there is just one handset.

For example, in the event that a user lost their handset and purchased a replacement, the replacement handset could employ a synchronise function to download a replication of the user's messages from the datastore. This download could be by means of the binary coded text messages described above or by alternative means including an IP connection. Similarly, if a user accidentally deleted a desired message from their phone, they could access the repository website to examine messages that they had previously deleted on their phone, which might be shown for example in a trash folder, and request it be undeleted. Such a message could be undeleted using the techniques described above by resending the message to the phone. In this case, a command might be employed to identify the message as being one which is to be entered on the local datastore but shown as read, i.e. that it is not a new message.

Furthermore, whilst a significant advantage of the present application is that information is transmitted using the existing SMS infrastructure, as described above control messages being sent between the repository application on the phone and the repository itself may employ an alternative channel, such as an IP connection as might be implemented in a softphone. Moreover as further explained above, the repository need not be located within the messaging infrastructure of a network.

Accordingly, the above description is to be taken as being exemplary and the invention is not to be considered limited to the description but is to be understood in the spirit and scope of the claims which follow.

The invention claimed is:

1. A message repository for storing SMS messages for a plurality of mobile phone users, the repository comprising:
   a database configured to centrally store a plurality of message entries, each message entry in the database corresponding to an individual SMS message, each message entry comprising a status for the SMS message;
   a messaging engine configured to receive contents and details of the SMS messages and further configured to set an initial status of one or more of the message entries as unread; and
   a message status engine configured to receive a status update from a user's device for at least one of the SMS messages to indicate a change in state of one such SMS message and further configured to identify the status of that SMS message, to replace the status in the message entry for the SMS message stored in the database with the received status update, and to store the updated message entry status in the database for the SMS message, wherein the change in state is selected from at least one of a confirmation that the SMS message has been read, a request for deletion of the SMS message, and a request for moving the SMS message to a different location.

2. A message repository according to claim 1, wherein the details stored in the database for each SMS message comprise a sender of such SMS message, a recipient of such SMS message, and an SMS message timestamp.

3. A message repository according to claim 1, wherein each SMS message is identified in the database by a unique identifier.

4. A message repository according to claim 3, wherein the unique identifier is generated from a combination of a message sender, a message recipient, and a message timestamp.

5. A message repository according to claim 3, wherein the message status engine is configured to identify one of the SMS messages in the database from an identifier contained within the status update by comparing the identifier with the unique identifiers stored in the database.

6. A message repository according to claim 1, wherein the messaging engine comprises an incoming SMS interface configured to receive a further SMS text message from a sender destined for a user, and further wherein the messaging engine is configured to forward the further SMS text message to the user.

7. A message repository according to claim 6, wherein the messaging engine is configured to package text content of the received SMS text message within one or more binary coded SMS messages and to forward the one or more binary coded SMS messages to an intended message recipient.

8. A message repository according to claim 1, wherein the messaging engine comprises an outgoing interface configured to receive SMS text messages sent by users to recipients and further wherein the messaging engine is adapted to store a copy of each sent message as an entry in the database.

9. A message repository according to claim 8, wherein the messaging engine is configured to set the initial status of the sent message entry as sent.

10. A message repository according to claim 9, wherein the outgoing interface generates a unique identifier for the sent message entry in the database.

11. A message repository according to claim 10, wherein the sent message is encoded and sent to the sender.

12. A message repository according to claim 1, wherein at least one device is informed of any change in state of any SMS messages associated with a user of that device and stored on the database.

13. A message repository according to claim 1, wherein the message status engine is responsive to a status update message received over an IP connection containing a direction for updating a state of one or more of the SMS messages stored within the database.

14. A message repository according to claim 13, wherein the message status engine causes the state of the one or more SMS messages within the database to be updated based on the received direction.

15. A message repository according to claim 1, wherein the message status engine is configured to send messages to users over an IP connection informing the users of changes in the state of their messages within a database.

16. A message repository according to claim 15, wherein the change in the state comprises one or more of a confirmation that the message has been read, a request for deletion of the message, a request for moving the message to a different location, and a request to mark the message as unread.

17. A messaging device for use with a mobile telecommunications network for sending and receiving SMS messages, the messaging device comprising:
    a message module configured to send a status update message to an external message repository which centrally stores a plurality of message entries for SMS messages, each message entry in a database corresponding to an individual SMS message, each message entry comprising a status for the SMS message, based on performance of one or more predefined actions upon the SMS message; and
    a performance module configured to identify the performance of the predefined actions comprising at least one of create the SMS message, receive the SMS message, store the SMS message, send the SMS message, delete the SMS message, and move the SMS message.

18. A messaging device according to claim 17, wherein the status update message is sent via a further SMS message to the external message repository.

19. A messaging device according to claim 18, wherein the further SMS message is a binary coded SMS message.

20. A messaging device according to claim 17, wherein the status update message is sent by means of an IP connection to the external message repository.

21. A messaging device according to claim 17, wherein the message module is configured to send a copy of the received SMS message to the external message repository.

22. A messaging device according to claim 17, wherein the message module is configured to send a copy of the sent SMS message to the external message repository.

23. A non-transitory computer-readable storage medium holding code, comprising:
    code for sending a status update message to an external message repository which centrally stores a plurality of message entries for SMS messages, each message entry in a database corresponding to an individual SMS message, each message entry comprising a status for the SMS message, based on a performance of one or more predefined actions upon the SMS message;

code for identifying the performance of the one or more predefined set of actions comprise at least one of create the SMS message, receive the SMS message, store the SMS message, send the SMS message, delete the SMS message, and move the SMS message;

code for updating the status in the message entry for the SMS message based on the status update message; and code for storing the updated message entry in the database.

24. A messaging device that is used for receiving SMS text messages from a message center, comprising:
- a receiver to receive an encoded message containing a text message and metadata comprising information regarding a status of a SMS text message;
- a message module to examine the encoded message for an identifier identifying contents of the text message as corresponding to the SMS text message and upon making such an identification, extracting the text message from the encoded message;
- a display to present the extracted text message to a user as an incoming SMS text message; and
- an application module to update the metadata based on a performance of the user's action upon the extracted text message.

25. A messaging device according to claim 24, wherein the extraction of the text message from the encoded message and the presentation of the text message to the user as the incoming SMS text message is performed via an application.

26. A messaging device according to claim 25, further comprising:
- a datastore configured to store the extracted SMS text messages.

27. A messaging device according to claim 26, wherein a message identifier is extracted from the encoded message and stored with the SMS text message within the datastore.

28. A messaging device according to claim 25, wherein the device comprises an application responsive to the encoded messages associated with a particular port.

29. A messaging device according to claim 24, wherein the identifier is a protocol identifier and is examined to determine whether the encoded message is a text message.

30. A messaging device according to claim 24, wherein the message module is further configured to be responsive to further SMS text messages identifying a message within the datastore and identifying an action to update a state of the message within the datastore.

* * * * *